US 7,455,076 B2

United States Patent
Kwon et al.

(10) Patent No.: US 7,455,076 B2
(45) Date of Patent: Nov. 25, 2008

(54) APPARATUS AND METHOD FOR CONTROLLING EXHAUST PRESSURE IN SEMICONDUCTOR MANUFACTURING

(75) Inventors: Hyuk-Jin Kwon, Sungnam-si (KR); Jong-Chul Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 183 days.

(21) Appl. No.: 11/032,103

(22) Filed: Jan. 11, 2005

(65) Prior Publication Data

US 2005/0150559 A1 Jul. 14, 2005

(30) Foreign Application Priority Data

Jan. 12, 2004 (KR) .................. 10-2004-0001927

(51) Int. Cl.
*F16K 3/18* (2006.01)
(52) U.S. Cl. .............. 137/630.12; 137/487.5; 137/599.16; 251/210; 251/326
(58) Field of Classification Search ........... 137/630, 137/630.12, 630.14, 630.15, 637.4, 487.5, 137/530, 599.01, 599.16; 251/205, 326–328, 251/210–212
See application file for complete search history.

(56) References Cited

U.S. PATENT DOCUMENTS

| | | | | | |
|---|---|---|---|---|---|
| 723,303 | A | * | 3/1903 | Abeling | 431/13 |
| 1,872,213 | A | * | 8/1932 | Anderson | 126/285 R |
| 1,958,644 | A | * | 5/1934 | Smith | 137/487.5 |
| 1,991,081 | A | * | 2/1935 | Charpier | 137/487.5 |
| 2,349,727 | A | * | 5/1944 | Hopkins | 137/552 |
| 2,796,082 | A | * | 6/1957 | Green et al. | 137/630.15 |
| 2,883,148 | A | * | 4/1959 | Williams | 251/205 |
| 2,925,241 | A | * | 2/1960 | Baldwin | 251/212 |
| 3,633,626 | A | * | 1/1972 | Zirps et al. | 137/599.16 |
| 3,675,072 | A | * | 7/1972 | Hahn et al. | 137/487.5 |
| 3,700,003 | A | * | 10/1972 | Smith | 137/614.17 |
| 3,957,590 | A | * | 5/1976 | Rohde | 202/258 |
| 4,275,763 | A | * | 6/1981 | Fahrig | 137/613 |
| 4,408,627 | A | * | 10/1983 | Harris | 251/327 |
| 4,524,796 | A | * | 6/1985 | Ayers et al. | 137/613 |
| 4,565,212 | A | * | 1/1986 | Klein et al. | 137/487.5 |
| 4,664,139 | A | * | 5/1987 | Pfeiffer | 137/240 |
| 4,669,585 | A | * | 6/1987 | Harris | 137/599.16 |
| 4,779,649 | A | * | 10/1988 | Balter | 137/630.12 |
| 5,524,863 | A | * | 6/1996 | Davis | 251/127 |
| 5,654,885 | A | * | 8/1997 | Mayhew et al. | 137/487.5 |

(Continued)

FOREIGN PATENT DOCUMENTS

JP 35600359 A * 1/1981

(Continued)

*Primary Examiner*—Stephen M. Hepperle
*Assistant Examiner*—Craig Price
(74) *Attorney, Agent, or Firm*—Harness, Dickey & Pierce, P.L.C.

(57) ABSTRACT

An apparatus and method for controlling exhaust produced by a reactive chamber is provided. The apparatus for controlling exhaust may include, for example, a valve body having an exhaust hole for the exhaust to pass through, and may include a first and second valve which regulate the opening and/or the closing of the exhaust hole. A control device may control the operation of the first and second valves based on the internal pressure of the reactive chamber.

10 Claims, 8 Drawing Sheets

U.S. PATENT DOCUMENTS

| | | | |
|---|---|---|---|
| 5,791,318 A * | 8/1998 | Schulz et al. | 123/520 |
| 6,170,521 B1 * | 1/2001 | Rohr et al. | 251/212 |
| 6,325,096 B1 * | 12/2001 | Rising et al. | 137/487.5 |
| 2004/0118464 A1 * | 6/2004 | Chang et al. | 137/630 |

FOREIGN PATENT DOCUMENTS

| | | | |
|---|---|---|---|
| JP | 56003359 A | * | 1/1981 |
| KR | 2002-0030184 A | | 4/2002 |

* cited by examiner

APPARATUS AND METHOD FOR CONTROLLING EXHAUST PRESSURE IN SEMICONDUCTOR MANUFACTURING

CROSS-REFERENCE TO RELATED APPLICATION

This application claims the benefit of Korean Patent Application No. 2004-1927, filed Jan. 12, 2004, the disclosure of which is hereby incorporated by reference herein in its entirety.

BACKGROUND OF THE INVENTION

1. Technical Field

The present invention relates to an apparatus and method for controlling exhaust pressure in a semiconductor manufacturing system. Controlling exhaust pressure in a semiconductor system may increase the number of times a valve is opened and/or closed. A valve may include one or more additional valves, which may be opened and closed selectively, and which may operate at a cross-section of an exhaust hole.

2. Discussion of the Related Art

Some example considerations of semiconductor technology may include integration, density, performance and large-diameter wafer design. To increase integration and/or produce performance semiconductor products, it may be necessary to satisfy specific manufacturing conditions. The amount of pressure, the level of temperature and/or the amount of gas are some examples of semiconductor manufacturing considerations.

Semiconductor manufacturing may include an exhaust system, for example, a chamber may be connected with a vacuum pump via a connecting pipe. Based on this configuration the pipe may be selectively opened and/or closed, which may occur after a gas is discharged into the chamber. A valve may be installed between the process chamber and the vacuum pump for controlling the discharge gas flow through the pipe. The valve may act to reduce or increase the amount of pressure formed in the chamber by regulating the flow of exhaust gas.

In a conventional configuration, a chamber may control the pressure and the amount of exhaust gas. The chamber may, for example, provide a bypass path at one side of a main exhaust path of a pipe, and/or provide a bypass path with a control valve. The control valve may be separate from another valve of the main exhaust path of the pipe, and/or the two valves may be in a series configuration in the main exhaust path.

A conventional configuration may also provide a throttle valve disposed between a reactor and a mechanical booster pump. The throttle valve and the mechanical booster pump may be connected, and may operate to control the amount of pressure in the reactor.

FIGS. 1-2 illustrates a conventional valve used for regulating and/or controlling the exhaust gas flow in a pipe. As shown, the valve may be disposed between the reactive chamber and the vacuum pump. The valve may open and/or close via the vacuum pressure of the vacuum pump, thus the pressure in the reactive chamber may be controlled. For a wafer, for example having a large diameter, the internal volume of a reactive chamber and the size of a pumping port may be larger to control the flow of exhaust gas.

FIG. 3 illustrates a rate of change for the open area of an exhaust hole based on the distance a valve is moved in a valve port, according to the conventional configurations of FIGS. 1-2. It may be noted that the pressure of the reactive chamber may change abruptly when a closed valve is opened.

If the amount of pressure in the reactive chamber changes abruptly, then a control mechanism may not perform accurately. The control mechanism may control the degree of openness of the valve based on the amount of pressure in the reactive chamber. Therefore, controlling the degree of openness of the valve may be difficult.

The vacuum pump and/or the valve may be controlled based on the amount of pressure in the reactive chamber. If the amount of pressure in the reactive chamber is not accurately measured, then it may be difficult to accurately control the pressure in the reactive chamber. The inability to properly control the pressure in the reactive chamber may result in instability, which may lead to reduced system performance and/or of the product yield.

SUMMARY OF THE INVENTION

An example of the present invention may include an apparatus and/or a method for controlling exhaust used in semiconductor manufacturing. For example, a valve having a first diameter and a valve having a second diameter larger than the first, may operate together to regulate the amount of pressure in a reactive chamber. It may be possible to predict a pressure change in the reactive chamber when one or more valves open or close.

Another example of the present invention may provide reducing the amount of pressure change in a reactive chamber, which may increase the level of efficiency and product yield of the semiconductor manufacturing process.

An example embodiment of the present invention may provide an apparatus, which may include a valve body, a first and a second valve, at least one driving device and/or a control device. The valve body may have at least one exhaust hole, and the first valve may operate by slidably moving inside the exhaust hole for opening or closing at least a portion of the exhaust hole. The second valve may operate by slidably moving along at least one surface of the first valve for opening and/or closing a hole formed in the first valve. The second valve may open and/or close at least a remaining portion of the exhaust hole which may not be covered by the first valve. The at least one driving device may operate by driving the first valve and the second valve, and the control device may operate by controlling the at least one driving device based on the internal pressure of the reactive chamber.

Example embodiments of the present invention may include the first valve slidably moving before the second valve is driven to slidably move, and the device used to drive the first and second valves may be a motor. Further, an exhaust line may be disposed between the reactive chamber and a vacuum pump to control the displacement of the exhaust which may be produced.

Example embodiments of the present invention may further include the hole of the first valve being formed on a center line of a plated side of the first valve. The hole may have a shape that increases in size from a first end to a second end of the hole. The hole may also increase in width from a first end to a second end along the direction that the second valve is moved. The shape of the hole may include three sides, where at least one of the three sides of the shaped hole is arced inwardly towards the area formed by the three sides. Also, the hole may have three sides, where at least one of the three sides of the shaped hole is arced outwardly away from the area formed by the three sides.

An example embodiment of the present invention may provide an apparatus, which may include a valve body, a first and a second valve, at least one driving device and/or a control device. The valve body may have at least one exhaust hole, and the first valve may operate by rotatably moving inside the exhaust hole for opening or closing at least a portion of the exhaust hole. The second valve may operate by rotatably moving inside the exhaust body for opening and/or closing a hole formed in the first valve. The second valve may open and/or close at least a remaining portion of the exhaust hole which may not be covered by the first valve. The at least one driving device may operate by driving the first valve and the second valve, and the control device may operate by controlling the at least one driving device based on the internal pressure of the reactive chamber.

Example embodiments of the present invention may include the first valve being disposed in the closed position at a right angle to the direction exhaust may flow in the exhaust hole. The first and the second valves may also be disposed on a concentric circle, and may be disposed in a round shaped plate. The second valve may have an inner and an outer diameter, wherein the outer diameter is substantially flush with the circumferential surface of the wall of the hole formed in the first valve. The second valve may be supported by an axis of rotation which penetrates at least one portion of the first valve.

An example embodiment of the present invention may provide an apparatus, which may include a valve body, a first and a second valve, at least one driving device and/or a control device. The valve body may have at least one exhaust hole, and the first valve may operate by moving inside the exhaust hole for opening or closing at least a portion of the exhaust hole. The second valve may operate by moving inside the exhaust body for opening and/or closing a hole formed in the first valve. The second valve may open and/or close at least a remaining portion of the exhaust hole which may not be covered by the first valve. The at least one driving device may operate by driving the first valve and the second valve, and the control device may operate by controlling the at least one driving device based on the internal pressure of the reactive chamber.

Another exemplary embodiment of the present invention may provide a method, which may include opening or closing at least a portion of an exhaust hole via a first valve, wherein the first valve is movable inside the exhaust hole for opening or closing at least a portion of the exhaust hole. The method may further include opening or closing at least a hole formed in the first valve via a second valve, wherein the second valve is movable inside the exhaust hole for opening or closing the hole formed in the first valve, and wherein the second valve opens or closes at least a remaining portion of the exhaust hole which may not be covered by the first valve. Further, the method may provide driving the first valve and the second valve to perform the opening or closing operations, and controlling the driving based on the internal pressure of the reactive chamber.

Example embodiments of the present invention may include the first and second valve opening and/or closing via slidable or rotatable movement.

BRIEF DESCRIPTION OF THE DRAWINGS

Example embodiments of the present invention will become more apparent to those of ordinary skill in the art by describing in detail example embodiments thereof with reference to the attached drawings in which.

DETAILED DESCRIPTION OF THE EXAMPLE EMBODIMENTS OF THE PRESENT INVENTION

The present invention now will be described more fully hereinafter with reference to the accompanying drawings, in which the example embodiments of the present invention are illustrated. However, this invention should not be construed as limited to the example embodiments set forth herein. Rather, the example embodiments are provided so that this disclosure will be thorough and complete, and will fully convey the scope of the invention to those skilled in the art.

Figure 1:
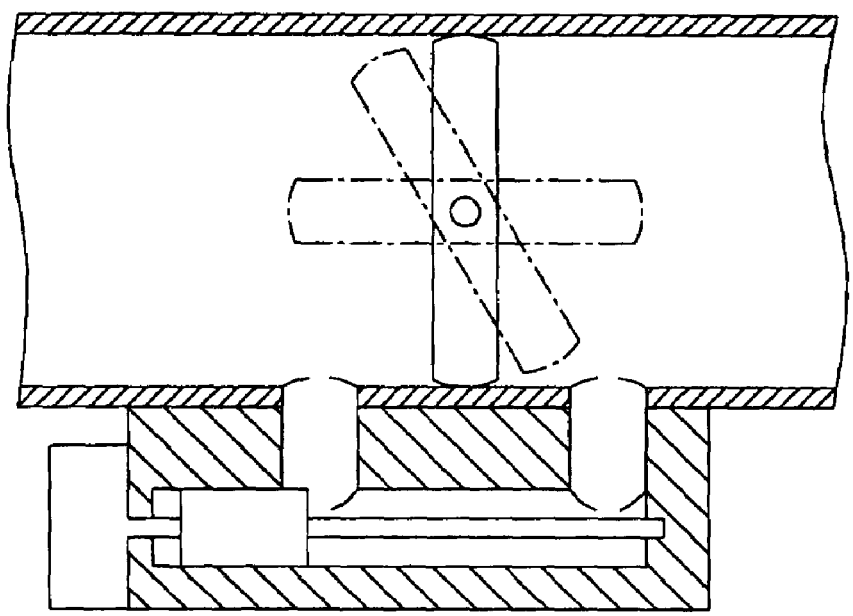
FIGS. 1 and 2 are views illustrating a conventional structure for controlling exhaust.
Figure 2:
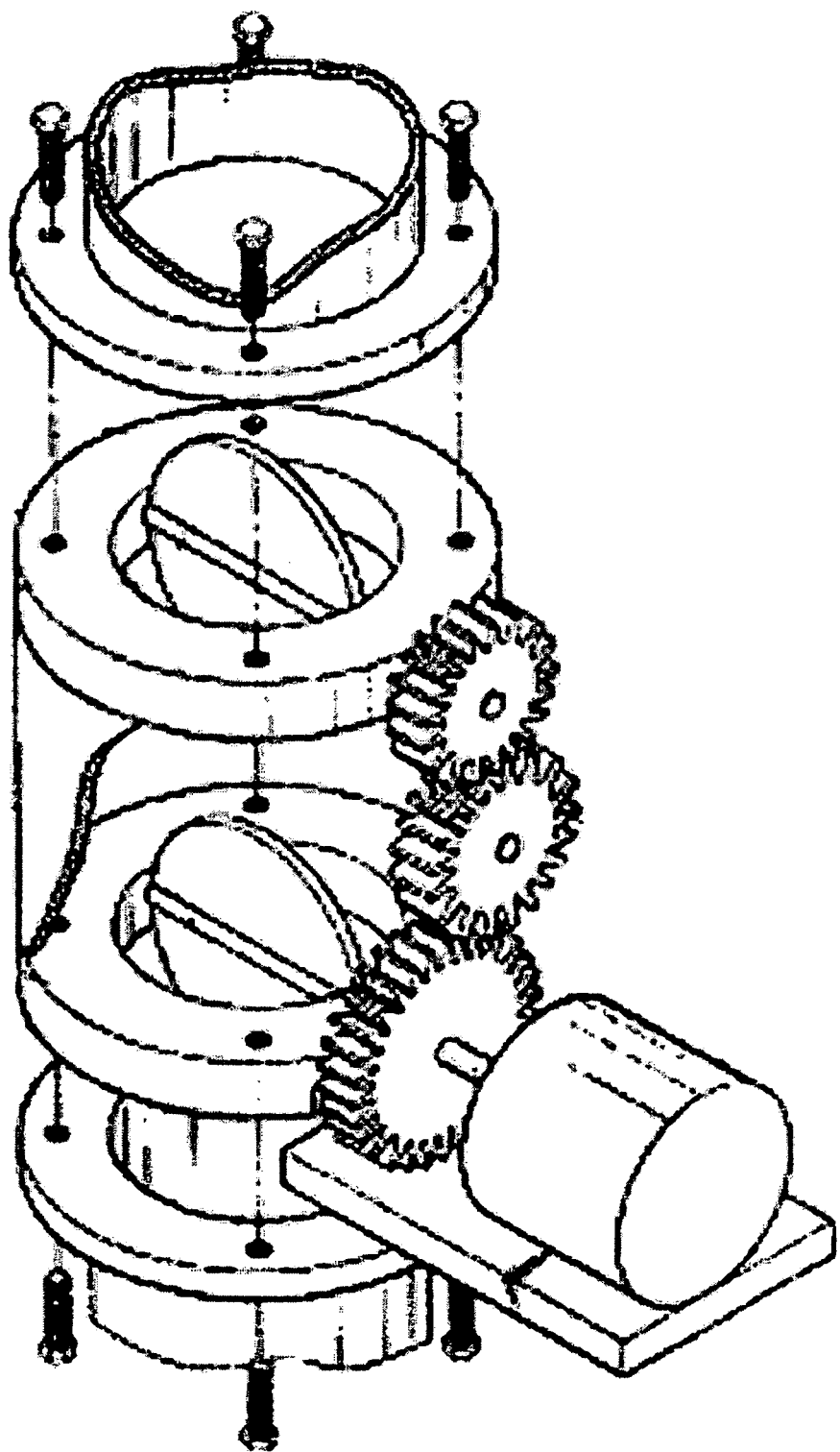
Figure 3:
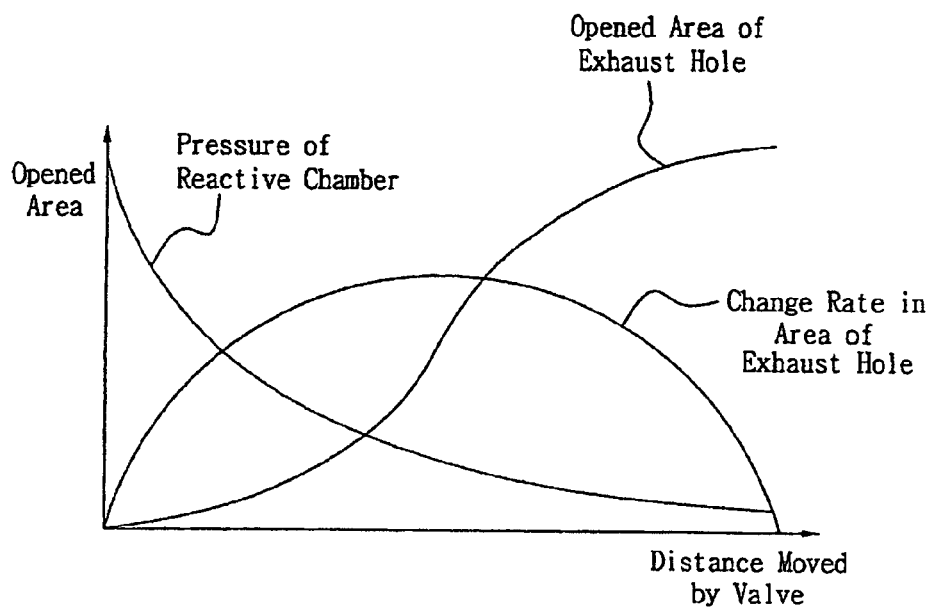
FIG. 3 is a graph illustrating rate of change for an open area of an exhaust hole based on a unit movement distance of a valve according to a conventional apparatus for controlling exhaust.
Figure 4:
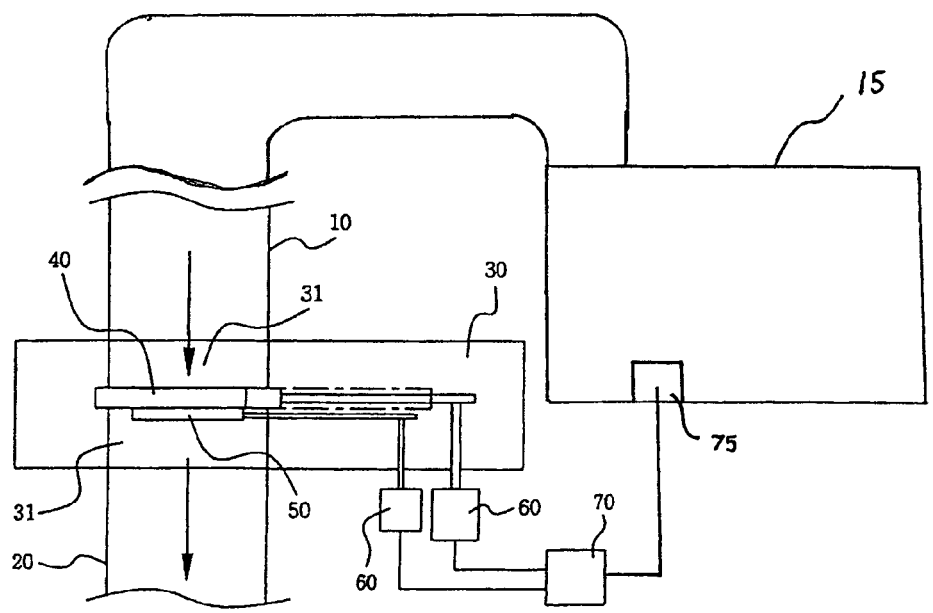
FIG. 4 is a cross-sectional view illustrating a structure for controlling exhaust, according to an example embodiment of the present invention.

FIG. 4 illustrates an exhaust management device, according to an example embodiment of the present invention. Referring to FIG. 4, a valve body 30 may be connected to an exhaust line 10 on the side of the reactive chamber 15, and to an exhaust line 20 on the side of the vacuum pump (not shown). The valve body 30 may control the displacement of exhaust that passes through the valve body 30, and may include an exhaust hole 31. The exhaust hole 31 may provide a passage for the exhaust to pass through exhaust lines 10 and 20, connected to the valve body 30.

A first valve 40 of the valve body 30, may have a plate structure that allows the exhaust hole 31 to open and close. The first valve 40 may have a larger size than the inner diameter of the exhaust hole 31, which may allow the exhaust hole 31 to be cut-off by the first valve 40 when the first valve is in a closed position. The first valve 40 may be disposed at a right-angled direction to the flow of exhaust in the exhaust hole 31. For example, the first valve 40 may be slidably movable in the direction perpendicular to the flow of exhaust, which may pass through the exhaust hole 31. The first valve 40 may regulate the amount of exhaust that passes through the exhaust hole 31.

Figure 5:
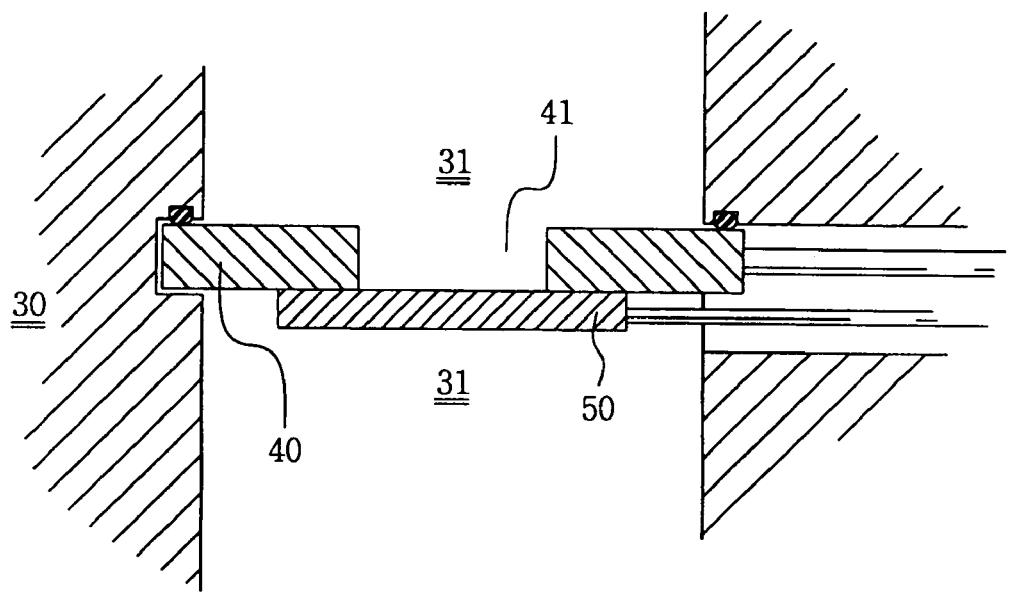
FIG. 5 is an enlarged cross-sectional view illustrating a structure of first and second valves, according to an example embodiment of the present invention.

FIG. 5 illustrates an enlarged cross-sectional view illustrating a structure of the first and second valves 40 and 50, according to an example embodiment of the present invention. Referring to FIG. 5 the first valve 40 may include a hole 41, which may be formed to be smaller in length than a second valve 50. For example, the length of a plate surface of the second valve 50 may be larger than the length of the hole 41, thus the second valve 50 may be able to block the flow of exhaust gas that may flow through the hole 41.

Figure 6:
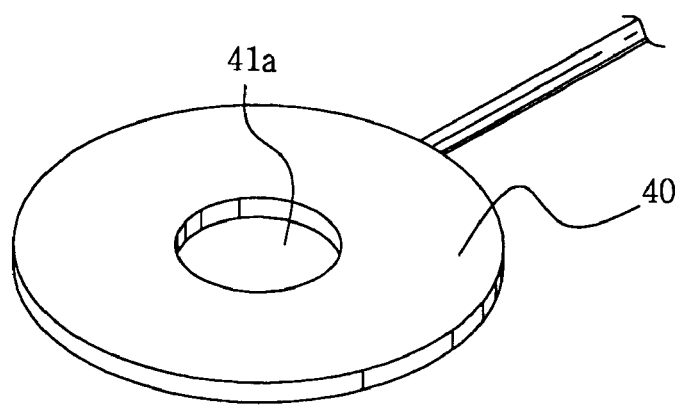
FIGS. 6-9 illustrate different perspective views of a hole formed in a first valve, according to an example embodiment of the present invention.

An example embodiment of the present invention may provide a hole 41a in the first valve 40, which may be formed in a rounded or circular patterned shape on a center line of the first valve 40, as illustrated in FIG. 6.

Figure 7:
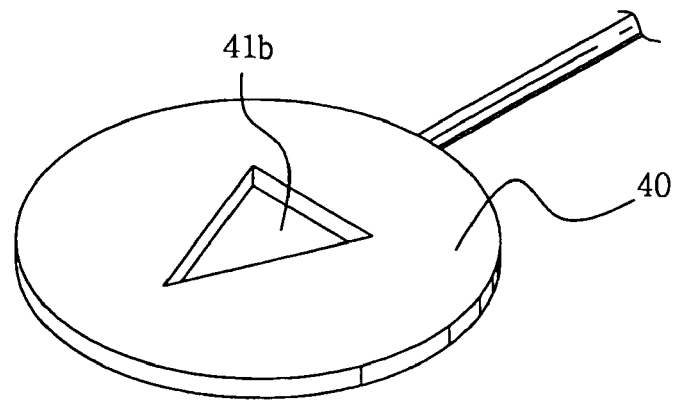

An example embodiment of the present invention may provide a hole 41b in the first valve 40, which may be formed in a triangular patterned shape on a center line of the first valve 40, as illustrated in FIG. 7. For example, FIG. 7 may provide a hole 41b having a shape with a width that gradually expands from a front end to a rear end. The hole 41b may be formed along the direction that the second valve 50 may be moved. FIG. 7 illustrates a triangle hole 41b which may be, for example, an equilateral triangle having the front end as the apex and the two other sides toward the rear end of the hole 41b.

Figure 8:
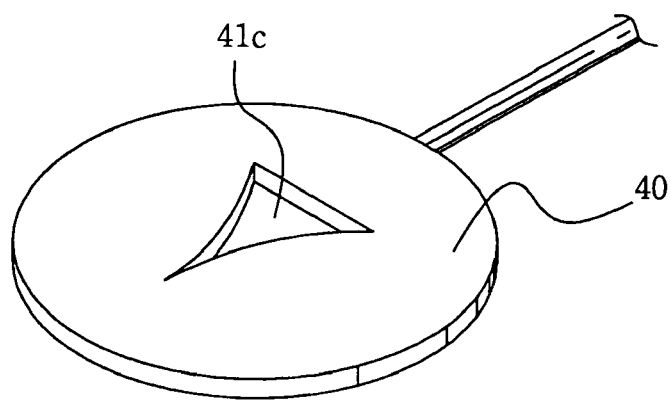

FIG. 8, according to example embodiment of the present invention, illustrates a hole 41c having a triangular shape where at least two of the three sides of the triangular shaped hole 41c are arced inwardly towards each other.

Figure 9:
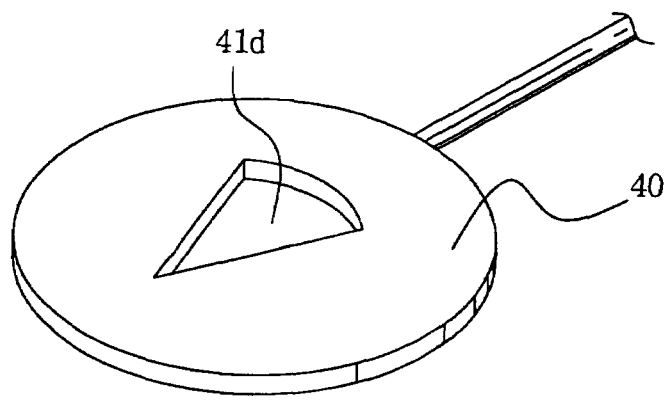

FIG. 9, according to an example embodiment of the present invention, illustrates a hole 41d having a triangular shape where one of the sides arcs away from the area formed by the triangular shaped hole 41d.

Figure 10:
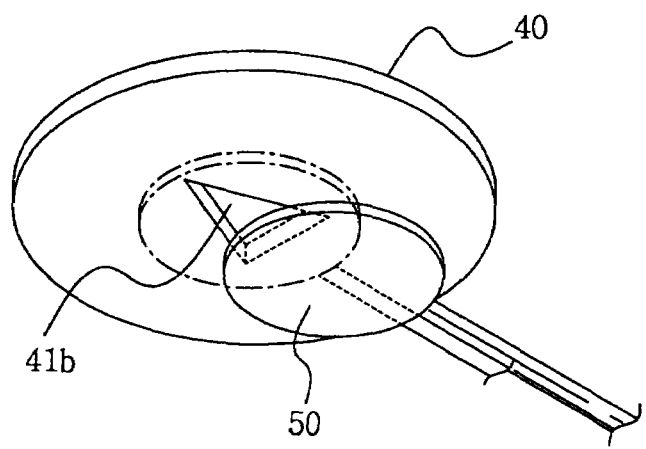
FIG. 10 is a bottom view illustrating an operational state of a first and a second valve according to an example embodiment of the present invention.

FIG. 10, according to an example embodiment of the present invention, illustrates a second valve 50, which may have a plate structure similar to the first valve 40. The second valve 50 may be in close contact with at least one side of the first valve 40. The second valve 50 may be slidably movable in a same direction of the first valve 40 and along the plate side of the first valve 40. The position of the second valve 50 may be aligned to control the open and closed states of hole 41b. For example purposes, the hole 41b has been described in the example embodiment of FIG. 10, however, any of the hole designs 41a-41d may be incorporated by the example embodiment of FIG. 10 and/or other example embodiments described herein.

The hole 41 of the first valve 40 and/or the second valve 50, may be formed, for example, to be relatively small in size compared to the relative size of the exhaust hole 31. The hole 41 and/or the second valve 50 may only control a relatively small amount of exhaust displacement when the valve may be opened and/or closed.

The second valve 50 may be capable of completely covering the hole 41 of the first valve 40. The width and/or length of the second valve 50 may be formed to be longer than the longest width or length of the hole 41. However, the second valve 50 may not be limited to any one individual shape or size, and may not be the same shape as the hole 41.

Referring to FIG. 5, the first valve 40 and the second valve 50 may be slidably movable to control the open area of the exhaust hole 31 and the hole 41 of the first valve 40.

FIG. 4, according to an example embodiment of the present invention, may include one or more driving devices 60, (i.e., driving motors) for driving the first valve 40 and/or the second valve 50. The driving devices 60 may be controlled by a control device 70, which may measure, via measuring means 75, and/or control the pressure in the reactive chamber 15. Means for measuring the pressure in a chamber are well known to those skilled in the art and are not discussed further herein. The amount of pressure in the reactive chamber 15 may be slowly changed by the control device 70. Referring to FIG. 4, a valve body 30 may be disposed between a reactive chamber 15 and a vacuum pump, for example, an ultra-high vacuum pump (not shown). An exhaust line 10 of the reactive chamber 15 and an exhaust line 20 of the vacuum pump may be connected together in the valve body 30. The exhaust hole 31 may be formed through the exhaust lines 10 and 20, inside the valve body 30.

Figure 11:
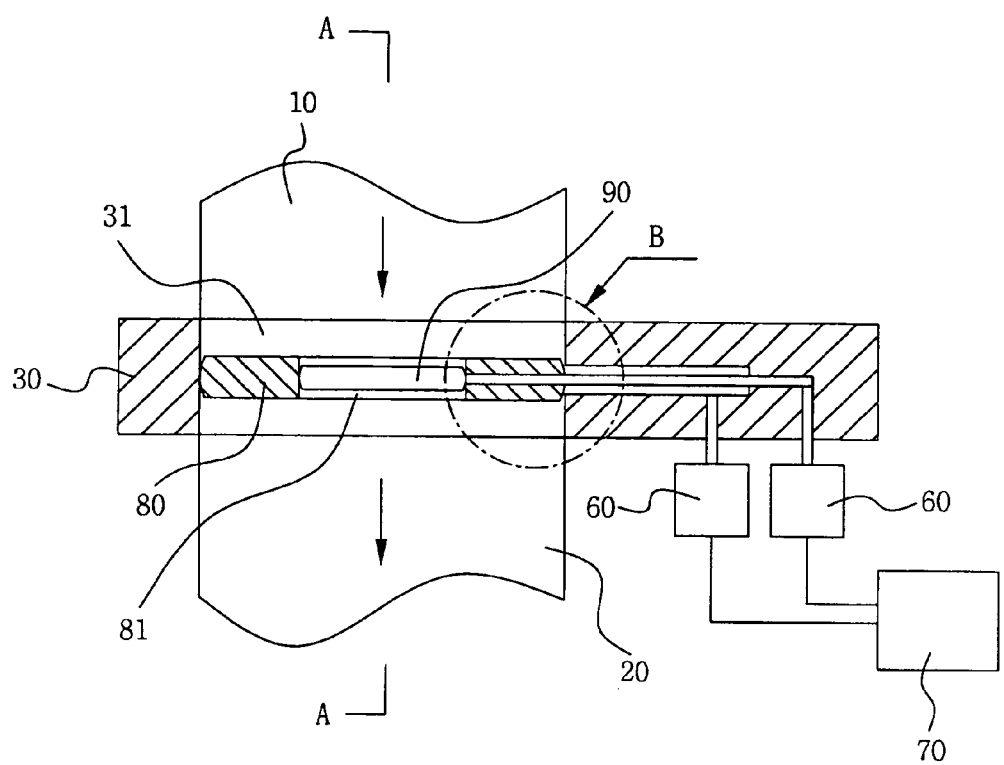
FIG. 11 is a side cross-sectional view illustrating another example embodiment of the present invention.

The valve body 30 of FIG. 11 may include, for example, a first valve 80 and a second valve 90. The driving devices 60 may control the operation of the first and second valves 80 and 90. FIG. 11 illustrates first and second valves 80 and 90 in the valve body 30, similar to the first and second valves 40 and 50 described in FIGS. 4-5, however, in FIG. 11 the first and second valves 80 and 90 may be rotatable around an axis.

In FIG. 11, according to an example embodiment of the present invention, the first valve 80 may have a plate structure for opening and closing the exhaust hole 31, formed in the valve body 30. An outward shape of the first valve 80 may be formed to closely match a cross-sectional area of the inside circumference of the exhaust hole 31, and may be formed substantially flush to the surface wall of the inside circumference of the exhaust hole 31. It may be possible to rotate around an axis in the valve body 30 so that the open and closed states of the exhaust hole 31 may be controlled by the angular rotation of the first valve 80.

The first valve 80 may include a hole 81 where a second valve 90 may be disposed. The second valve 90 may be rotatably movable about the inner circumference of the hole 81. For example, the second valve 90 may have a diameter that extends along the inside of the diameter of the hole 81. However, the second valve 90 should be rotatably movable inside the hole 81.

Figure 12:
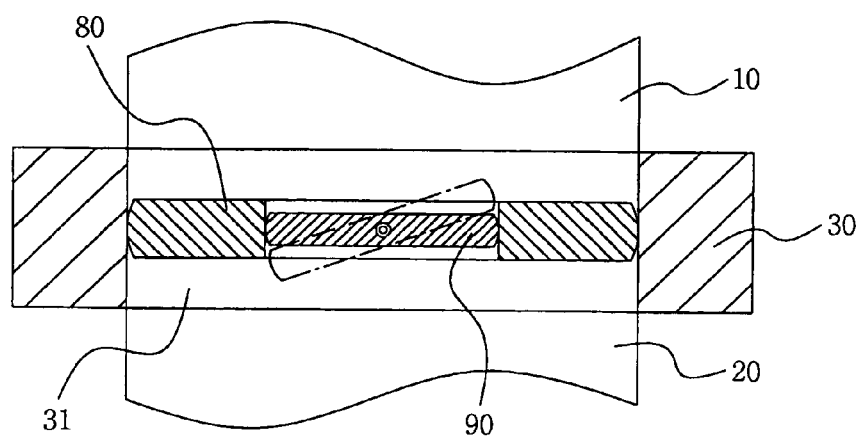
FIG. 12 is a cross-sectional view illustrating the imaginary line "A-A" of FIG. 11.

FIG. 12, according to an example embodiment of the present invention, illustrates the first valve 80 and the hole 81 formed in the first valve 80, and the second valve 90 having a rounded shape. FIG. 12 is a cross-sectional view of the imaginary line "A-A" of FIG. 11.

Figure 13:
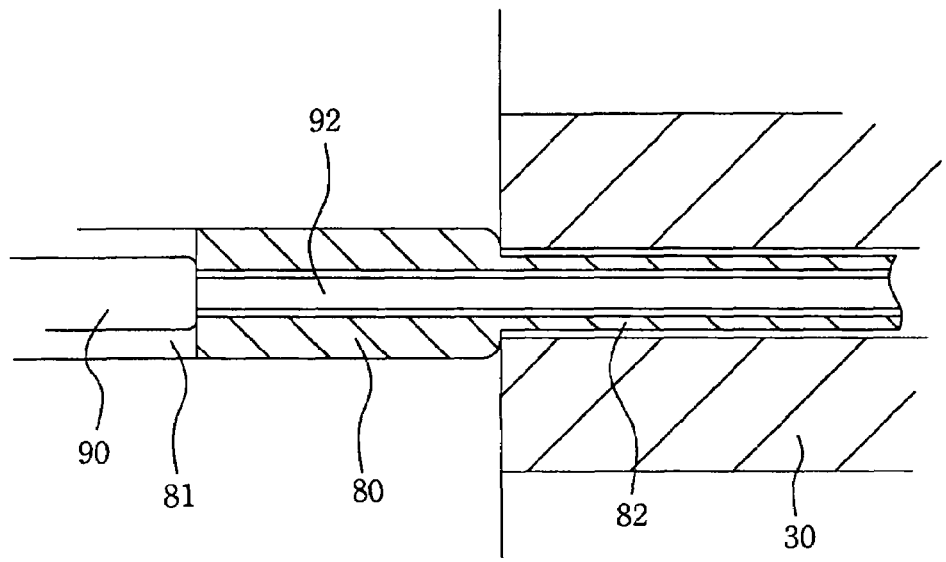
FIG. 13 is an enlarged view illustrating Part "B" of FIG. 11.

FIG. 13, according to an example embodiment of the present invention, illustrates an axis of rotation 92, which may support the second valve 90. The axis of rotation 92 may, for example, penetrate an area formed on one or more sides of the first valve 80, and/or penetrate the inside of the axis of rotation 82 in the first valve 80, as illustrated in FIG. 13. The first valve 80 may control the degree of openness of the area of the exhaust hole 31, and the second valve 90 may control the degree of openness of the area of the hole 81 of the first valve 80. FIG. 13 is a detailed view of the "B" area illustrated in FIG. 11.

An example of loading a wafer on a reactive chamber will now be explained in detail below, with reference to the example embodiments illustrated in FIGS. 5 and 11. The hole 41, 81 of the first valve 40, 80 may be closed by the second valve 50, 90 before the wafer is loaded. Once the wafer is loaded, it may be used to reduce the amount of pressure in the reactive chamber. If the vacuum pump is driven, the hole 41, 81 formed in the first valve 40, 80 may be opened to reduce the amount of pressure in the reactive chamber. The pressure may be reduced gradually by slowly opening the hole 41, 81 formed in the first valve 40, 80.

The control device 70 may check (for example, continuously checking) the pressure in the reactive chamber and control the degree of openness of the exhaust hole 31. A driving device 60 may drive the first valve 40, 80 and the second valve 50, 90 to an open or closed position based on the amount of pressure in the reactive chamber. The opened area of the exhaust hole may be expanded (for example, gradually) until the amount of pressure in the reactive chamber is satisfactory.

Figure 14:
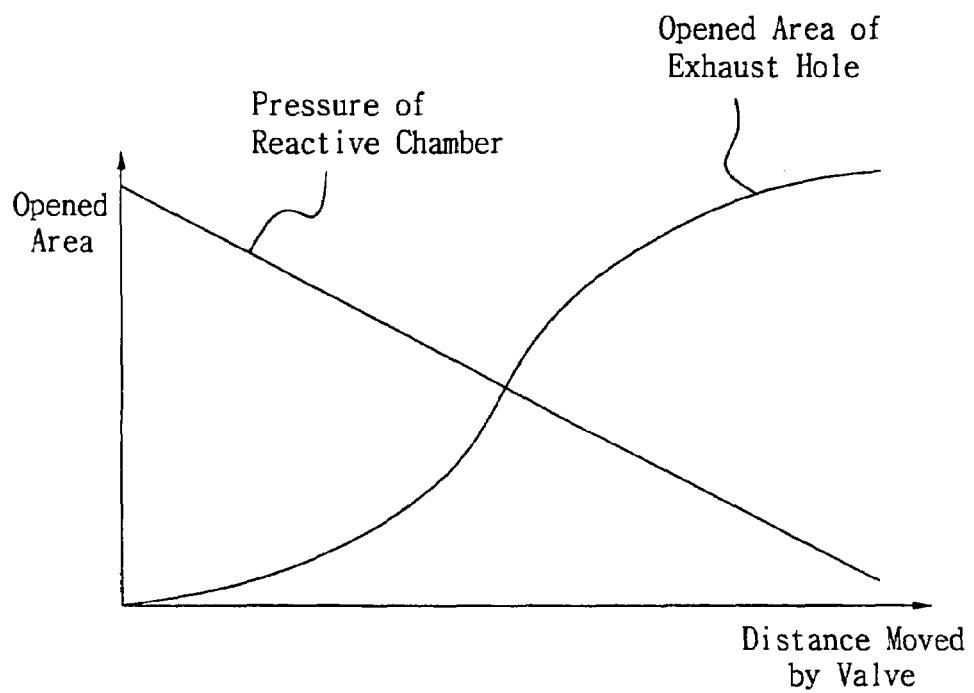
FIG. 14 is a graph illustrating a pressure change in a reactive chamber according to an example embodiment of the present invention.

The control device 70 may be capable of reducing the amount of change between the initial opening of the second valve 50, 90 and the last instance the second valve 50, 90 is closed. Further, the control device 70 may be capable of anticipating a change of pressure in the reactive chamber and moving the first 40, 80 and/or the second valves 50, 90, based on the amount of pressure in the reactive chamber. The measurements made by the control device 70 may provide a smooth change in the amount of pressure in the reactive chamber. The smooth transition is evident from the line illustrated in FIG. 14. This line indicating the pressure of the reactive chamber has a relatively constant slope, as illustrated in FIG. 14.

An auxiliary valve (not shown) may be provided for changes (for example, small incremental changes) in the amount of pressure within a main valve structure. The auxiliary valve may provide a way to predict a pressure change in a reactive chamber, and/or a pressure change resulting from open and/or closed states of one or more valves. The auxiliary valve may provide additional accuracy when regulating the amount of exhaust.

The example embodiments herein have been described as having two valves which are slidably and rotatably movable to control the open area of an exhaust hole. However, the example embodiments of the present invention are not limited to two valves which open and close via slidable and rotatable movement. Other example embodiments may include variations having two or more valves which operate according to other types of valve movement.

The invention has been described with reference to example embodiments disclosed herein. However, the scope of the invention is not limited to the disclosed example embodiments. The scope of the invention is intended to include modifications and alternative arrangements within the capabilities of persons skilled in the art. Therefore, changes may be made in the example embodiments of the present invention disclosed, which are within the scope and the spirit of the invention outlined by the following claims.

What is claimed is:

1. An apparatus for controlling pressure in a semiconductor manufacturing system, provided in an exhaust line between a reactive chamber and a vacuum pump, comprising:
   a valve body having at least one exhaust hole in the exhaust line;
   a first valve slidably movable inside the exhaust hole for opening or closing at least a portion of the exhaust hole, wherein said first valve has a substantially circular plate structure;
   a second valve slidably movable along at least one external surface of the first valve for opening or closing a hole formed in the first valve, wherein said second valve opens or closes at least a remaining portion of the exhaust hole which is not covered by the first valve;
   a first driving device for driving the first valve and a second driving device for driving the second valve to an open or closed position based on the amount of pressure in the reactive chamber; and
   a control device electrically connected to the first and second driving devices for checking the pressure in the reactive chamber and controlling each of the driving devices based on the internal pressure of the reactive chamber.

2. The apparatus of claim 1, wherein the first driving device drives the first valve to slidably move before the second driving device drives the second valve to slidably move.

3. The apparatus of claim 1, wherein at least one of the first driving device and the second driving device is a motor.

4. The apparatus of claim 1, wherein the hole of the first valve is formed on a center line of a plate surface of the first valve.

5. The apparatus of claim 1, wherein the shape of the hole of the first valve has a width that increases in size from a first end to a second end of the hole.

6. The apparatus of claim 5, wherein the width of the hole of the first valve increases in width from a first end to a second end of the hole along the direction that the second valve is moved.

7. The apparatus of claim 1, wherein the shape of the hole of the first valve has a width that increases in size from a first end to a second end of the hole, and wherein said hole has three sides where at least one of the three sides of the shaped hole is arced inwardly towards the area formed by the three sides.

8. The apparatus of claim 1, wherein the shape of the hole of the first valve has a width that increases in size from a first end to a second end of the hole, and wherein said hole has three sides where at least one of the three sides of the shaped hole is arced outwardly away from the area formed by the three sides.

9. An apparatus for controlling pressure in a semiconductor manufacturing system, provided in an exhaust line between a reactive chamber and a vacuum pump, comprising:
   a valve body having at least one exhaust hole;
   a first valve slidably movable inside the exhaust body for opening or closing at least a portion of the exhaust hole, wherein said first valve has a substantially circular plate structure;
   a second valve slidably movable along an external surface of the first valve for opening or closing a hole formed in the first valve, wherein said second valve opens or closes at least a remaining portion of the exhaust hole which is not covered by the first valve;
   a first electric motor for driving the first valve and a second electric motor for driving the second valve; and
   a control device for controlling each of the motors based on the internal pressure of the reactive chamber.

10. A method comprising:
    opening or closing at least a portion of an exhaust hole via a first valve, wherein said first valve has a substantially circular plate structure and is slidably movable inside the exhaust hole for opening or closing at least a portion of the exhaust hole;
    opening or closing at least a hole formed in the first valve via a second valve, wherein said second valve is slidably movable along an external surface of the first valve for opening or closing the hole formed in the first valve, wherein said second valve opens or closes at least a remaining portion of the exhaust hole which is not covered by the first valve;
    driving the first valve and the second valve to perform said opening or closing operations;
    measuring an internal pressure of a reactive chamber; and
    controlling the driving based on the internal pressure of the reactive chamber.

* * * * *